(12) United States Patent
Gonsalves

(10) Patent No.: US 9,400,647 B2
(45) Date of Patent: Jul. 26, 2016

(54) APPLICATION DISCOVERY AND INTEGRATION USING SEMANTIC METAMODELS

(71) Applicant: Michael Gonsalves, Stoughton, MA (US)

(72) Inventor: Michael Gonsalves, Stoughton, MA (US)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 13/840,726

(22) Filed: Mar. 15, 2013

(65) Prior Publication Data

US 2014/0282404 A1 Sep. 18, 2014

(51) Int. Cl.
*G06F 9/44* (2006.01)
*H04L 29/08* (2006.01)
*H04W 4/00* (2009.01)

(52) U.S. Cl.
CPC .. *G06F 8/70* (2013.01); *G06F 8/36* (2013.01); *H04L 67/16* (2013.01); *H04W 4/001* (2013.01); *G06F 8/10* (2013.01)

(58) Field of Classification Search
USPC ........................................................ 717/120
See application file for complete search history.

(56) References Cited

U.S. PATENT DOCUMENTS

| | | | |
|---|---|---|---|
| 8,005,879 B2 | 8/2011 | Bornhoevd et al. | |
| 8,370,863 B2 | 2/2013 | Grigoriev et al. | |
| 8,468,491 B2 | 6/2013 | Markovic | |
| 8,631,046 B2 | 1/2014 | B'Far et al. | |
| 8,645,276 B2 | 2/2014 | Wong et al. | |
| 8,650,043 B1 | 2/2014 | Phillips | |
| 8,666,951 B2 | 3/2014 | Hanis et al. | |
| 8,707,261 B2 | 4/2014 | Heller et al. | |
| 8,806,424 B1 | 8/2014 | Ray et al. | |
| 2002/0038335 A1* | 3/2002 | Dong et al. | 709/203 |
| 2004/0078777 A1* | 4/2004 | Bahrami | 717/105 |
| 2004/0250238 A1 | 12/2004 | Singh et al. | |
| 2005/0138173 A1 | 6/2005 | Ha et al. | |
| 2007/0094256 A1 | 4/2007 | Hite et al. | |
| 2010/0250559 A1 | 9/2010 | Glaenzer et al. | |
| 2011/0179397 A1 | 7/2011 | Pfeifer et al. | |
| 2011/0283269 A1 | 11/2011 | Gass et al. | |
| 2012/0096429 A1* | 4/2012 | Desai et al. | 717/107 |
| 2012/0143867 A1 | 6/2012 | Roy et al. | |
| 2014/0282404 A1 | 9/2014 | Gonsalves | |

FOREIGN PATENT DOCUMENTS

EP 2779582 A2 9/2014

OTHER PUBLICATIONS

Extended European Search Report received for European Patent Application No. 14159522.3, mailed on Aug. 28, 2014, 6 pages.
Burmester et al., "Tool Integration At the Meta-Model Level: The Fujaba Approach", International Journal on Software Tools for Technology Transfer, Nov. 11, 2004, pp. 203-218.

* cited by examiner

*Primary Examiner* — Hang Pan
(74) *Attorney, Agent, or Firm* — Brake Hughes Bellermann LLP

(57) ABSTRACT

A metamodel selector may determine a semantic metamodel for at least two software applications, the semantic metamodel including a description of semantics, processes, and data that are applicable to the at least two software applications. A metadata manager may determine application metadata describing an application of the at least two applications. A transformation engine may transform the application metadata into an application-specific metamodel instance of the semantic metamodel, and an integration engine may integrate the at least two software applications, based on the application-specific metamodel instance.

17 Claims, 11 Drawing Sheets

APPLICATION DISCOVERY AND INTEGRATION USING SEMANTIC METAMODELS

TECHNICAL FIELD

This description relates to integration of software applications.

BACKGROUND

Software applications, such as business applications, are often composed of multiple applications and related services, all working together. In some situations, application users may adopt a standard set of such applications and related services from a single supplier, in an attempt to ensure that the various components will work well together. However, in many scenarios, the best solutions to meet specific user needs are often made up of heterogeneous technologies in a hybrid landscape, combining best-in-class applications. Moreover, even in cases in which all components are obtained from a single supplier, there is no guarantee that the components will fit perfectly together. Consequently, integration of multiple software applications is often required, and typically represents a time-consuming, manually intensive, error prone, expensive, and generally inefficient process for obtaining the desired result.

SUMMARY

According to one general aspect, a system may include recorded on a non-transitory computer readable storage medium and executable by at least one processor. The system may include a metamodel selector configured to cause the at least one processor to determine a semantic metamodel for at least two software applications, the semantic metamodel including a description of semantics, processes, and data that are applicable to the at least two software applications. The system may include a metadata manager configured to cause the at least one processor to determine application metadata describing an application of the at least two applications. The system may include a transformation engine configured to cause the at least one processor to transform the application metadata into an application-specific metamodel instance of the semantic metamodel. The system may include an integration engine configured to cause the at least one processor to integrate the at least two software applications, based on the application-specific metamodel instance.

According to another general aspect, a computer-implemented method for causing at least one processor to execute instructions recorded on a computer-readable storage medium may include determining a semantic metamodel for at least two software applications, the semantic metamodel including a description of semantics, processes, and data that are applicable to the at least two software applications. The method may include determining application metadata describing an application of the at least two applications, transforming the application metadata into an application-specific metamodel instance of the semantic metamodel, and integrating the at least two software applications, based on the application-specific metamodel instance.

A computer program product may be tangibly embodied on a non-transitory computer-readable medium and may comprise instructions that, when executed, are configured to cause at least one processor to determine a semantic metamodel for at least two software applications, the semantic metamodel including a description of semantics, processes, and data that are applicable to the at least two software applications. The instructions, when executed, may be further configured to determine application metadata describing an application of the at least two applications, transform the application metadata into an application-specific metamodel instance of the semantic metamodel, and integrate the at least two software applications, based on the application-specific metamodel instance.

The details of one or more implementations are set forth in the accompanying drawings and the description below. Other features will be apparent from the description and drawings, and from the claims.

DETAILED DESCRIPTION

Figure 1:
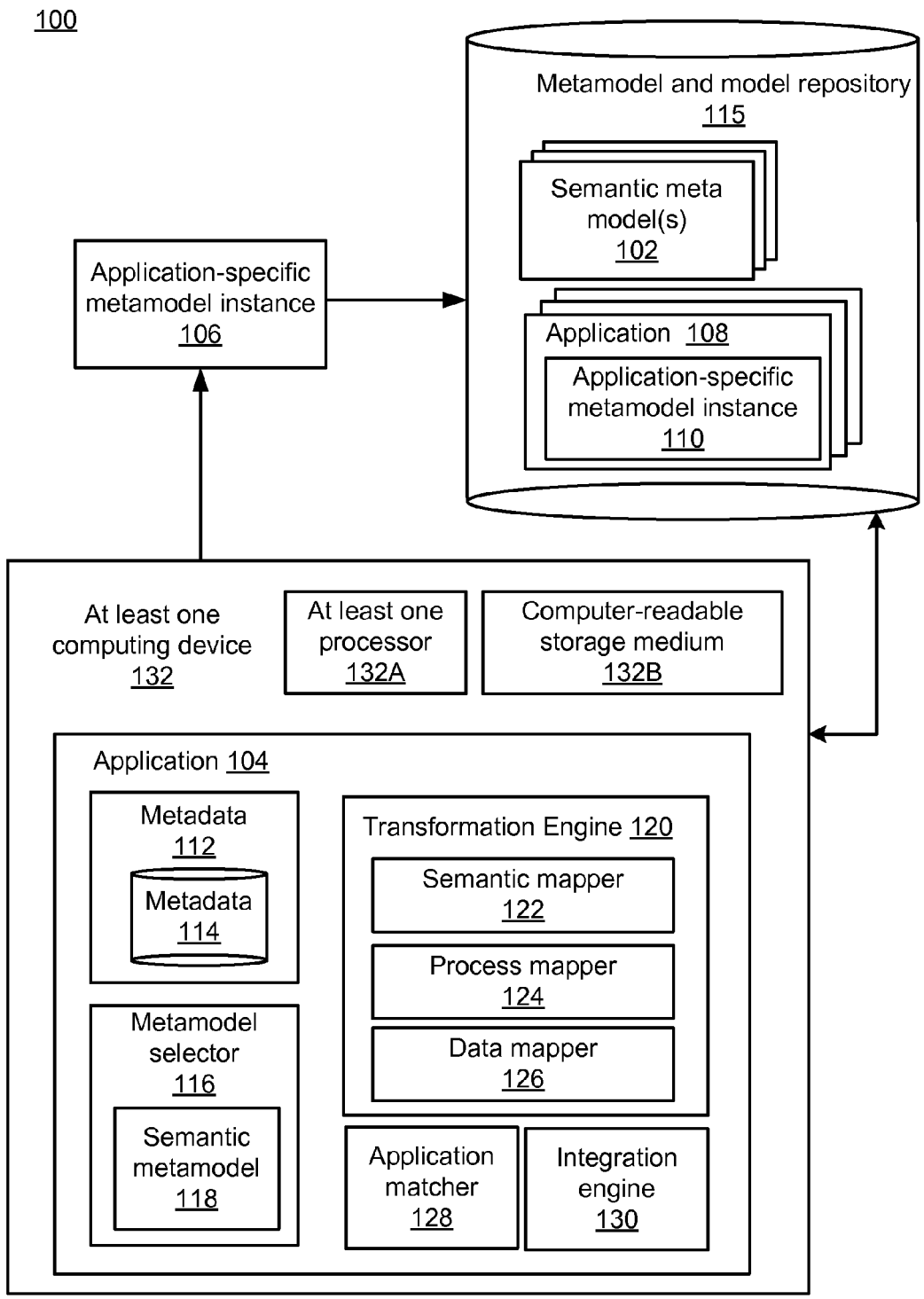
FIG. 1 is a block diagram of a system for application discovery and integration using a semantic metamodel.

FIG. 1 is a block diagram of a system 100 for application discovery and integration using semantic metamodels. In the example of FIG. 1, one or more semantic metamodels 102 may be utilized by an application 104 to create an application-specific metamodel instance 106 therefrom. Thereafter, the application 104 may be integrated for use with a second application 108, which itself may be associated with a corresponding application-specific metamodel instance 110. In other words, by creating the application-specific metamodel instances 106, 108 from the same, common underlying semantic metamodel 102, the applications 104, 108 may be easily integrated with one another, with little or no human involvement in the integration process, and in a manner that is generally more convenient, fast, cost effective, and efficient than existing integration techniques.

Thus, in the system 100, one or more of the semantic metamodels 102 provide the application 104 with an ability to describe itself in a generic, common, high level language, where the resulting description is represented in FIG. 1 as the application-specific metamodel instance 106. In other words, rather than focusing on specific details of an individual integration between two specified applications, and explicitly mapping semantics and data from one such application to the other, the semantic metamodel 102 enables the application 104 to generate its self-describing application-specific metamodel instance 106, independently of any specific integration with any other software application. For example, as described in more detail below, it may occur that the application 108 may not even exist at a time that the application-specific metamodel instance 106 is created.

Nonetheless, once the application 108 is created, discovered, or otherwise identified or determined for integration with the application 104, the semantic metamodels 102 (i.e., an appropriate semantic metamodel selected therefrom, as described below) provide for a generic, high level language for describing systems, data structures, and functionalities of each of the applications 104, 108, without affecting the underlying, actual low level implementations of these things in each application 104, 108, which may themselves therefore continue to function in system-specific, e.g., proprietary, ways.

In the example of FIG. 1, the application 104, and the application 108, should be understood to conceptually represent virtually any software application. As such, either or both of the applications 104, 108 should be understood to execute, e.g., locally, or in a secure environment behind a firewall, over a public network, or in any other suitable execution environment. In many of the examples that follow, the applications 104, 108 are described as business applications, such as may be operated by a company, enterprise, or other business entity. However, again, it may be appreciated that such examples are non-limiting, and that the applications 104, 108 also may represent many other types of software applications, such as, e.g., educational applications, government applications, charitable or other non-profit applications, or applications designed for personal use by a user.

Whatever a nature of type of the application 104, FIG. 1 illustrates that a metadata manager 112 may be utilized to manage associated application metadata 114 which describes aspects, features, and functions of the application 104. For example, the metadata 114 may describe a type and location of associated data, e.g., master data or configuration data, used by the application 104. The metadata 114 also may describe various processes executed by the application 104, e.g., processes for manipulating the above-referenced data and/or external data. In some cases, the metadata 114 may relate such processes to relevant use cases and descriptions thereof. For example, in the case of business applications, the metadata 114 may describe the application 104 in the context of various, relevant business processes and associated use cases.

In some cases, the metadata 114 may simply be provided in conjunction with the application, e.g., by a creator or publisher thereof, in which case the metadata manager 112 may be responsible simply for storing/accessing the metadata 114. In other scenarios, the metadata manager 112 may be responsible for generating the metadata 114 automatically, e.g., based on an analysis of underlying application code of the application 104. In still other examples, the metadata manager 112 may be configured to interact with a user of the application 104 to create the metadata 114, even long after an original creation or publication of the application 104.

As referenced above, it may occur that one or more semantic metamodels 102 are available for use with or by the application 104. Accordingly, the application 104 is illustrated as including a metamodel selector 116, which may be configured to select a particular semantic metamodel 118 from the one or more semantic metamodels 102 for creation of the application-specific metamodel instance 106. Consequently, as described in more detail below, it may be appreciated that the application 108 should be understood to utilize some or all of the same semantic metamodel 118 in creating its associated, application-specific metamodel instance 110.

Thus, in some examples, it may occur that, of the available semantic metamodels 102, only one (i.e., the semantic metamodel 118) is available or compatible for use with the application 104. In other scenarios, it may occur that two or more of the semantic metamodels 102 could be used with the application 104, but that the application 104 may choose from among the available subset of the semantic metamodels 102, based on a desired nature and type of integration (e.g., based on a type of integration and associated semantic metamodel relevant to a type or class of application, or to the application 108 itself, if known at the time).

In practice, the metamodel selector 116 may operate by selecting or otherwise identifying one or more features or use cases contained within the metadata 114, for comparison thereof against the semantic metamodels 102. For example, such features may be pre-determined by the user of the application 104, or may be dynamically selected by the metamodel selector 116, based, e.g., on other aspects of the application 104. Then, by comparing the thus-identified features of the application 104 from the metadata 114 to corresponding aspects of the semantic metamodels 102, the metamodel selector 116 may identify the semantic metamodel 118 to be used in obtaining the application-specific metamodel instance 106.

In the example of FIG. 1, the semantic metamodels 102 are illustrated as being stored within a metamodel and model repository 115. As described in detail below, the repository 115 provides a central, available, searchable location, which thus facilitates, e.g., operations of the metamodel selector 116 in selecting the semantic metamodel 118. For example, in scenarios in which the system 100 is implemented in the context of a specific business or other enterprise, the repository 115 may be implemented within an associated on-premises IT environment. In other example implementations, however, as described in detail below, the repository 115 may be implemented in Cloud-based scenarios, in which the repository 115 is publicly available to all users of the application 104.

In specific examples, the semantic metamodels 102, including the semantic metamodel 118, may be implemented as XML (extensible markup language) schemas. In general, as is known, such a schema describes allowable structures and contents of XML documents that are compatible therewith. Accordingly, a transformation engine 120 may be configured to utilize the semantic metamodel 118 together with the metadata 114, to thereby provide the application-specific metamodel instance 106 as an XML document. As such, and in example implementations, the application-specific metamodel instance 106, as well as the application-specific metamodel instance 110, may be created, stored, and utilized using well-known techniques for searching for and manipulating XML documents. Nonetheless, it may appreciated that various other types of current or future schemas may be utilized to implement the semantic metamodels 102.

In the example of FIG. 1, the transformation engine 120 executes several different types of mappings in order to instantiate the semantic metamodel 118 using the metadata 114, to thereby obtain the application-specific metamodel instance 106. For example, the transformation engine 120 is illustrated as including a semantic mapper 122, which may be operable to transform individual or combinations of terms and/or concepts within the metadata 114 into corresponding terms/concepts, using language consistent with the semantic metamodel 118.

Detailed examples of such semantic mappings are provided in detail below, but, for the sake of illustration, it may occur that the application 104 is a business application related to obtaining a request for proposal (RFP), which uses the term "winning bid" obtained from a "vendor." At the same time, the semantic metamodel 118 may include a portion that relates to such RFPs, in which the semantic mapper 122 determines that a "supplier" is equivalent to a "vendor," and a "winning bid" contains final price information for a "line item" of an "outline agreement" defined in the semantic metamodel 118. As may be appreciated with respect to the simplified example, the application 108 may utilize a term such as "seller" or "provider," yet the application-specific metamodel instance 110 associated therewith may similarly refer to such entities as "supplier," thereby providing the above-referenced common framework for referring to a given concept during a subsequent integration of the applications 104, 108.

Somewhat similarly, a process mapper 124 may map processes described in the metadata 114 to processes specified within the semantic metamodel 118. In this regard, it may be appreciated that a single process of the metadata 114 may correspond to two or more processes of the semantic metamodel 118, or, conversely, multiple processes of the metadata 114 may refer to a single process of the semantic metamodel 118. In still other example scenarios, a given number of a plurality of processes of the metadata 114 may correspond to a same or different number of processes specified in the context of the semantic metamodel 118. For example, it may occur that the metadata 114 describes a series of process steps, but that the semantic metamodel 118 only needs to specify a first and last step of the series of process steps in order to facilitate desired integrations of the application 104 with other applications, such as the application 108. For example, in a pricing process, the metadata 114 may specify various rounds of negotiations (e.g., auctions) for lowering an initially offered price. Meanwhile, the semantic metamodel 118 may only require the fact that a price was requested and ultimately obtained for purposes of specifying the application-specific metamodel instance 106.

Finally with respect to the transformation engine 120 of the example of FIG. 1, the data mapper 126 may be configured to relate data types and specific data instances of the metadata 114 to the semantic metamodel 118. For example, as referenced above, the data mapper 126 may seek to relate master data or configuration data of the application 104 to corresponding types of data within the semantic metamodel 118.

The data mapper 126 may also be responsible for mapping individual data fields of data of the application 104 to corresponding data fields within the application-specific metamodel instance 106. In this regard, it may be appreciated that, although examples of mapping data from one field to another are, by themselves, well known, the data mapper 126 of FIG. 1 provides for specific functionalities which enable these and other types of data mapping in the context of the semantic metamodel 118, to thereby facilitate a desired integration of the application 104 in a manner that is partially or completely automated, and therefore generally more efficient and cost effective than existing techniques which require varying extents of manual identification of data fields to be mapped.

As referenced above, the repository 115 may serve as a central point of discovery, identification, and selection of one or more of the semantic metamodels 102 by the metamodel selector 116. Similarly, an application matcher 128 may be utilized to discover, select, and utilize the application 108, and/or other applications, for integration with the application 104. In other words, the repository 115 may be used to register a plurality of applications, such as the application 108, providing various features and functions which may be desirable to use in conjunction with operations of the application 104. In practice, all such applications may be stored or referenced in conjunction with corresponding application-specific metamodel instances, so that, upon discovery/identification and selection thereof, any such application may be immediately available for integration with the application 104, utilizing the various techniques described above, and in conjunction with operations of an integration engine 130, described in more detail below.

For example, in a highly simplified example, it may occur that a user of the application 104 has specific knowledge of the individual application 108, and may desire integration of the application 104 therewith. In such scenarios, the user of the application 104 may utilize the application matcher 128 simply to identify the application 108 within a repository 115, perhaps simply by identifying the application 108 using an appropriate unique identifier or name. Thereafter, integration of the applications 104, 108 may proceed as described herein.

In other example implementations, however, the user of the application 104 may not have such specific knowledge. Rather, the user may simply have an idea of a desired (type of) functionality to be implemented by, or in conjunction with, operations of the application 104. In such cases, the application matcher 128 may be utilized to perform a search of applications stored in association with the repository 115, in order to match available applications and their associated functionalities with the desired functionalities to be included in an integration with the application 104.

For example, the application matcher 128 may be configured to search the applications of the repository 115 based on their corresponding names or other descriptions or metadata associated therewith, in order to ascertain a likelihood of desired functionality being provided thereby. Further, the application matcher 128 may restrict such searches to those applications which are associated with application-specific metamodel instances derived from the same semantic metamodel 118 utilized by the application 104 to generate the application-specific metamodel instance 106, in order to ensure compatibility between applications identified by the application matcher 128 and the application 104.

In more specific example implementations, the application-specific metamodel instance 106 may be provided with what is referred to herein as a bill of needs, which is designed to specify one or more functionalities that may be associated with the application 104, i.e., that may be provided one of the applications 108 for access thereto by integration of the application with the application 104.

As referenced above, and described in more detail below, the application-specific metamodel instance 106 may include various requirements of the application 104, as translated from the metadata 114 by the transformation engine 120, which specify functionalities and points of integration. Therefore, similarly, and as also explained in detail below, the bill of needs may be expressed using the same or substantially the same techniques as used in expressing such application features. In other words, the application features specify what the application 104 does, while the bill of needs specifies what the application 104 would like to have done by another application, which would presumably express its abilities in this regard in the context of its own application features included within its own application-specific metamodel instance.

Thus, the application matcher 128 may proceed by matching some or all of a bill of needs of the application-specific metamodel instance 106 with matching application features of the application-specific metamodel instance 110, and thereafter executing integration of the applications 104, 108 using the relevant portions of the application features and bill of needs of the application-specific metamodel instance 106 on the one hand, and the application features of the application-specific metamodel instance 110 on the other hand.

Figure 2A:
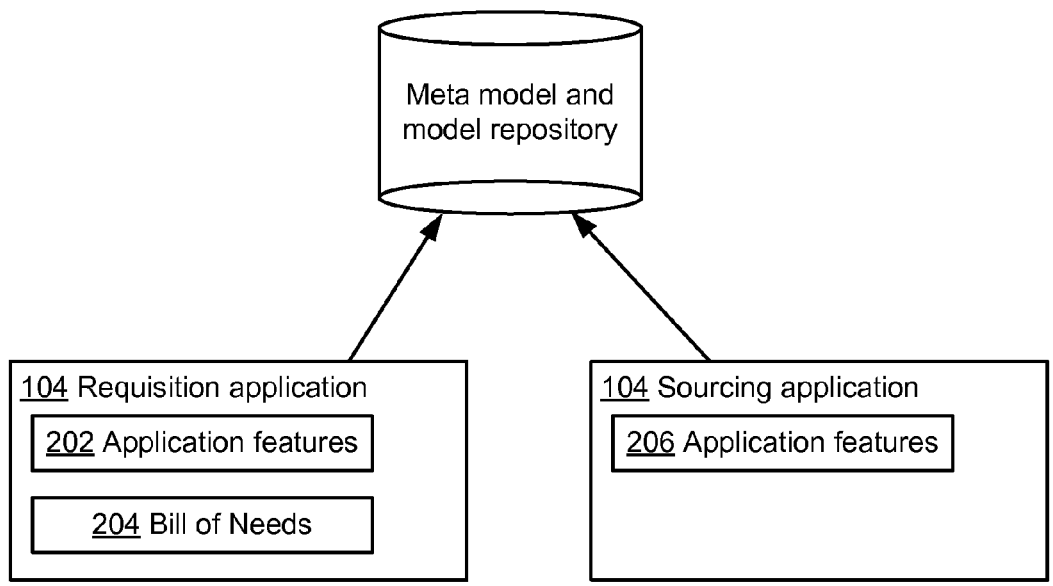
FIG. 2A is a block diagram of a discovery process of the system of FIG. 1.

By way of more specific examples, with reference to FIG. 2A, a discovery process that may be executed by the application matcher 128 is illustrated, in which the application 104 is illustrated as a requisition application which accesses the metamodel and model repository 115 to discover the application 108 as a sourcing application for integration therewith. In the example, as referenced above, the application-specific metamodel instance 106 may include both application features 202 and bill of needs 204 associated with the requisition application 104.

As described, the format and structure of the application features 202 and 204 may be identical or substantially identical, although the application features 202 specify capabilities and characteristics of the requisition application 104, while the bill of needs 204 express one or more desired capabilities and characteristics which are sought in the context of a sourcing application, such as the sourcing application 108. Meanwhile, the sourcing application 108 is illustrated as being associated with application features 206 of its own application-specific metamodel instance 110. As may be appreciated, the application features 206 may include a format and structure that matches both the application features 202 and bill of needs 204 of the application-specific metamodel instance 106, all of which are in accordance with the common semantic metamodel 118.

By way of specific, non-limiting example, it may occur that the requisition application 104 corresponds to a Cloud-based human resources system, which may wish to make use of a Cloud survey tool to support employee performance reviews. Meanwhile, the sourcing application 108 may represent one of perhaps a plurality of such survey tools. In operation, an owner or other provider of the survey tool 108 may wish to make such a survey tool publicly available for use in conjunction with the repository 115. In this regard, such a provider may publish or otherwise register the survey tool 108 in the repository 115. For example, rather than storing the survey tool 108 itself in conjunction with the repository 115, the provider may simply register a reference to the survey tool 108, in conjunction with registration of the corresponding application-specific metamodel instance 110, which itself may be made available for search and discovery within the repository 115.

It may be further appreciated that the applications 104, 108 may be developed completely independently of one another, and at different times. For example, the requisition application 104, e.g., the human resources application referenced above, may be developed before the sourcing application, e.g., the survey tool 108, even exists. Nonetheless, a developer or other provider of the human resources application 104 may recognize a potential need for such a survey tool, and may provide specifics of such a need within the bill of needs 204.

Thus, at some later time, an administrator or other user of the human resources application 104 may in fact wish to utilize the functionality of such a survey tool, and may be provided with an administrative dashboard or other user interface in the context of the human resources application 104, in which each general feature specified by the bill of needs 204, including the referenced survey tool, may be paired with a list of available services of the repository 115 and may be used to support the specified feature.

Then, the administrator may simply need to select a subscribe button or other appropriate interface element in order to initiate integration of the applications 104, 108 and thereby activate the desired functionality. Thereafter, for example, new buttons (or other UI artifacts) may be provided or enabled within the human resources application 104, in order to provide for launching an operation of the survey tool 108. In this way, the administrator of the human resources application 104 may identify and select the survey tool 108 as providing desired functionality, even if the survey tool 108 did not exist, and/or was developed wholly independently of, the human resources application 104. Moreover, it may be appreciated that the administrator may similarly update the desired survey functionality, using a different survey tool than the survey tool 108, if desired and if/when such a preferred survey tool becomes available within the repository 115.

Figure 2B:
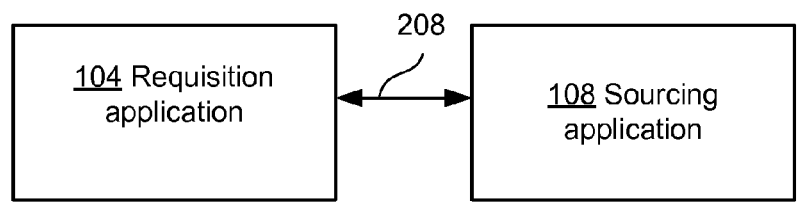
FIG. 2B is a block diagram of an integration process of the system of FIG. 1.

FIG. 2B illustrates an integration of the requisition application 104 and the sourcing application 108, as conceptually illustrated by arrow 208. For example, the integration engine 130 of FIG. 1 may be utilized to leverage the application-specific metamodel instances 106, 110, in order to automatically integrate the applications 104, 108 at a suitable or desired manner.

For example, the integration engine 130 may implement a mediated integration, in which the integration engine 130 or other suitable component serves as a central point of interaction between inputs and outputs of the applications 104, 108. In other example implementations, the integration 208 may be direct, so that the outputs of each application 104, 108 are suitably provided as direct inputs to the other of the applications 104, 108 as inputs thereof. In these and other examples, it may be appreciated that the various inputs/outputs of the applications 104, 108 are commonly specified and described through the use of the corresponding application-specific metamodel instances 106, 110.

With reference back to FIG. 1, application 104 is illustrated as being executed using at least one computing device 132, which itself includes at least one processor 132A and computer readable storage medium 132B. That is, for example, instructions for execution of the application 104 may be stored using the computer readable storage medium 132B, and may be executed by the at least one processor 132A in order to obtain various features and functions described herein.

For example, the at least one processor 132A may represent multiple processors executed in parallel. Meanwhile, the computer readable storage medium 132B may be utilized to store data of the application 104, such as master data or configuration data, or the metadata 114, as well as the actual instructions for execution of the application 104. Of course, the at least once computing device 132 may include, or be associated with, various peripheral components (e.g., human interface devices for displays), various power components, and various network or other communication interfaces, none of which are specifically illustrated in the example of FIG. 1, for the sake of simplicity and clarity.

Similarly, the at least one computing device 132 is represented generically in FIG. 1 for the sake of simplicity, but may be understood to represent any appropriate computing device, such as, e.g., a desktop computer, a computer of a computing cluster, or any appropriate mobile computing device (e.g., a laptop, notebook, netbook, tablet, or Smartphone). Further, in as much as the at least one computing device 132 may represent two or more computing devices in communication with one another, it may be appreciated that some or all of the functionalities described with respect to the application 104 may be implemented on a first such computing device, while remaining operations may be executed on the one or more computing devices and communications therewith.

For example, in particular, it may be appreciated that any of the various components 112-130 illustrated as executing in conjunction with the application 104 may be, in fact, executed separately from the application 104, e.g., using a separate computing device and/or a separate application or other hardware/software platform. In particular, for example, it may occur that the metamodel selector 116, the transformation engine 120, the application matcher 128 and/or the integration engine 130 may individually or collectively be executed outside of, and in communication with, the application 104. For example, these components may be operated as a middleware between the application 104 and the repository 115. Similarly, it may occur that these components are provided in conjunction with the repository 115 itself, using an appropriate Cloud-based hardware/software platform. Similarly, the metadata manager 112 may also be implemented separately from the application 104, such as in scenarios in which the application 104 is not initially provided with appropriate metadata 114.

Thus, from the above description, it should be apparent that, in various example scenarios, the application 104 may simply be an otherwise-conventional application, which may be registered with the repository 115 by an owner or other provider thereof. Thereafter, a provider of the repository 115 may utilize the various components 112-130 to generate the application-specific metamodel instance 106 for association with the application 104 within the repository 115, to thereby make the application 104 publicly available for integration with other applications utilizing the same semantic metamodel (e.g., 118) of the semantic metamodels 102. Such examples may be suitable for scenarios in which providers of the application 104 are unwilling or unable to generate the corresponding application-specific metamodel instance 106.

In other example scenarios, however, it may occur that the semantic metamodels 102, including the semantic metamodel 118, represent a known standard for commonly expressing features and needs of applications. In such scenarios, providers of such applications as the application 104 may desire to obtain the benefits of such a standard representation, and may adopt use of a corresponding, appropriate semantic metamodel in order to generate the application-specific metamodel instance 106 for registration in conjunction with the application 104 within the repository 115. Of course, similar comments and scenarios may apply to the application 108 and its corresponding application-specific metamodel instance 110, and to all such applications and associated metamodel instances registered in the context of the repository 115.

Thus, an aggregate and over time, the repository 115 may come to represent a large store of available applications which may be easily, e.g., automatically, integrated with one another in desired fashions, to thereby provide developers and other application users with desired functionalities in a cost-effective and efficient manner. Moreover, such advantages may be obtained even though the various application-specific metamodel instances are developed independently, in conjunction with their underlying applications, and without requiring knowledge of, or even existence of, the other applications which may be integrated therewith at some future point in time. Thus, the developers and other users of the various applications may each be provided with a large number and variety of potentially desirable applications and associated features, as well as with the ability to utilize such applications and associated features in a convenient manner.

Figure 3:
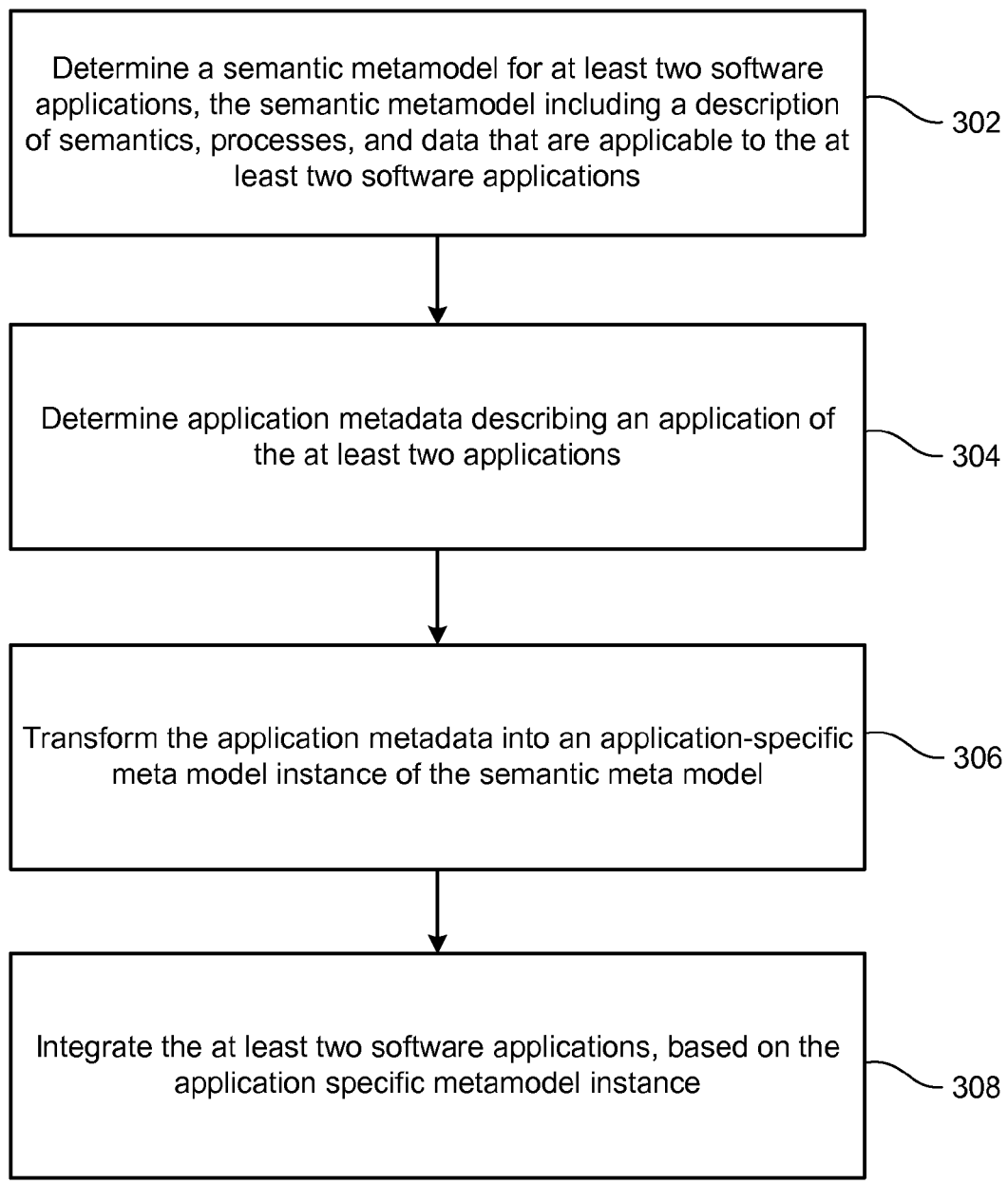
FIG. 3 is a flowchart illustrating example operations of the system of FIG. 1.

FIG. 3 is a flowchart 300 illustrating example operations of the system 100 of FIG. 1. In the example of FIG. 3, operations 302-308 are illustrated as separate, sequential operations. However, it may be appreciated that, in various implementations, any two or more of the operations 302-308 may be implemented in a partially or completely overlapping or parallel manner, or in a nested, iterative, or looped fashion. Further, additional or alternative operations may be included, and, in various implementations, one or more of the operations 302-308 may be omitted.

In the example of FIG. 3, a semantic metamodel may be determined for at least two software applications, the semantic metamodel including a description of semantics, processes, and data that are applicable to the at least two software applications (302). For example, the metamodel selector 116 of FIG. 1 may select the semantic metamodel 118 from the available semantic metamodels 102 of the metamodel and model repository 115. In some examples, only a single semantic metamodel may be applicable or compatible with a given software application, such as the application 104, so that metamodel selection per se need not be performed in every scenario. Further, as referenced above, it is not necessary to know of an existence, much less a particular identity, of both of the at least two software applications in order to utilize the selected semantic model with respect to a software application. Rather, the operation 302 merely requires that the referenced semantic metamodel provides the referenced description in a manner that is applicable to the at least two software applications, and, as described in detail herein, provides each of the at least two software applications with an ability to describe itself for current or future integration with the other application.

Application metadata describing an application of the at least two applications may be determined (304). For example, the metadata manager 112 of FIG. 1 may determine the metadata 114 of the application 104. As described, the metadata 114 may be currently available and stored in association with the application 104, and/or may be partially or completely generated for the application 104 by the metadata manager 112. As described, the metadata 114 may generally describe various features, aspects, or requirements of the application 104, in a manner that is generally application or assistant-specific, so that such applications may be provided with corresponding metadata in a manner that is suitable for (e.g., proprietary to) the given application and/or underlying platform.

The application metadata may be transformed into an application-specific metamodel instance of the semantic metamodel (306). For example, the transformation engine 120 may transform the metadata 114, using the semantic metamodel 118, to obtain the application-specific metamodel instance 106. In this way, the application in question, e.g., the application 104, may describe itself for current or future integrations.

Thus, the at least two software applications may be integrated, based on the application-specific metamodel instance (308). For example, the integration engine 130 may be configured to utilize integration points (e.g., input/output interfaces) identified by the application-specific metamodel instance 106 with respect to the application 104, in order to integrate the application 104 with the application 108.

Thus, FIG. 3 may be understood to represent a high-level operational flow of example, basic operations of the system 100 of FIG. 1. As referenced above with respect to FIG. 3, various additional or alternative operations may be included, many of which may be understood or appreciated from the above description of FIGS. 1, 2A, 2B.

For example, although not specifically recited in FIG. 3, the second of the at least two software applications may generally also be associated with a corresponding application-specific metamodel instance (e.g., the application-specific metamodel instance 110 associated with the application 108), so that the integration engine 130 may utilize both such instances to implement the integration of the applications 104, 108.

Similarly, FIG. 3 does not explicitly mention the use of the bill of needs referenced above, e.g., with respect to FIG. 2A, and associated matchings thereof between the bill of needs 204 of the requisition application 104 and corresponding application features 206 of the sourcing application 108. Nonetheless, again, it may be appreciated that any and all such additional or alternative operations may be included in an appropriate or desired manner in the context of the overall operational flow of the flowchart 300 of FIG. 3. Many such additional or alternative features and associated operations are described below with respect to the specific examples of FIGS. 4-11.

Figure 4:
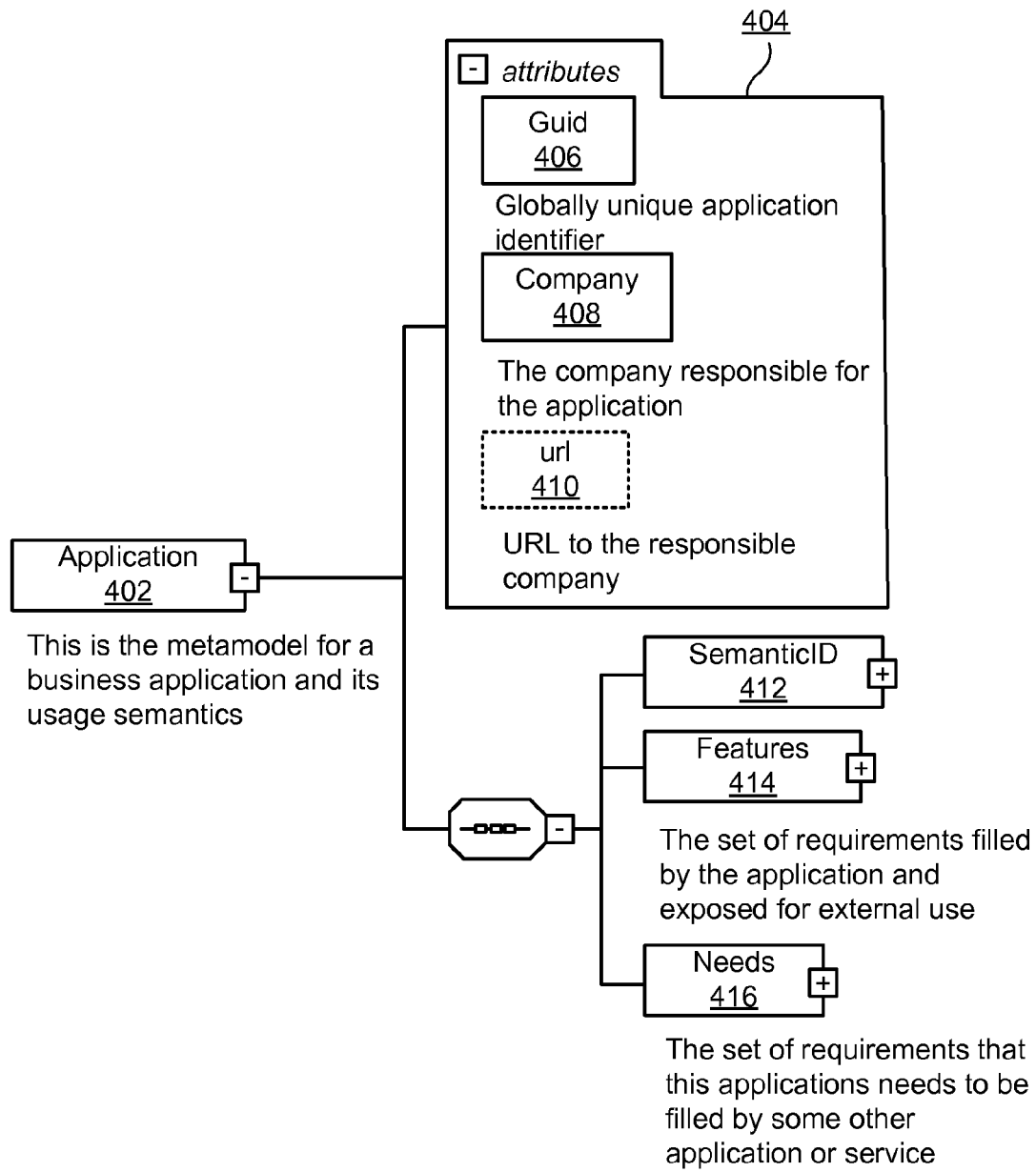
FIG. 4 is a diagram of an example semantic metamodel used in the system of FIG. 1.

FIG. 4 is a diagram 400 of a metamodel to be utilized in conjunction with a business application and its associated usage semantics. For example, such a metamodel may represent, e.g., the semantic metamodel 118 of FIG. 1. In the example of FIG. 4, an application 402 is described by corresponding attributes 404. In the example, as shown, the attributes 404 may include a globally unique identifier (GUID) 406, which will uniquely identify an underlying application used to instantiate the metamodel of FIG. 4. In other words, a result of instantiating the metamodel of FIG. 4 would be, e.g., the application-specific metamodel instance 106, so that the GUID 406 would assist in relating the resulting metamodel instance to the specific application in question.

Further within the attributes 404, a company 408 that is responsible for the application in question may be identified. Similarly, a uniform resource locator (URL) 410 may be included, which identifies the responsible company 408 through the use of a URL link, e.g., to the company website or relevant portion thereof.

Further in FIG. 4, a semantic ID 412 is included, which generally represents information relating to a description, purpose, and context of the application 402. More detailed examples of the semantic ID 412 are provided below, e.g., with respect to FIG. 5.

Also in FIG. 4, features 414 refer to a set of requirements filled by the application 402 and exposed for external use. In other words, the features 414 corresponds generally to the application features 202 of FIG. 2A. Similarly, needs 416 refer to a set of requirements that the application 402 desires or needs to be filled by some other application or service, in order to provide a corresponding functionality. Thus, the needs 416 responds generally to the bill of needs 204 described above with respect to FIG. 2A.

Figure 5:
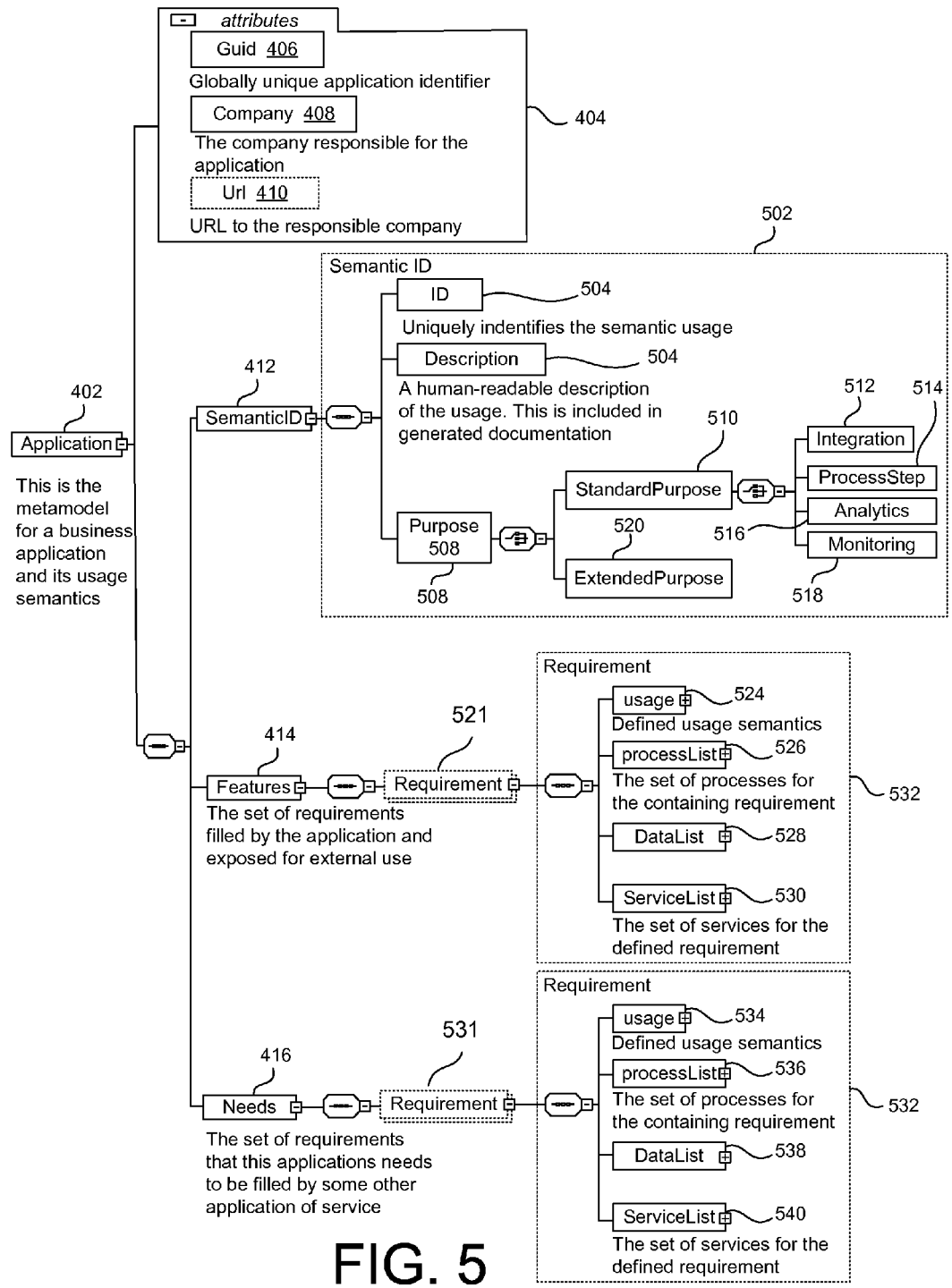
FIG. 5 is a more detailed example of the metamodel of FIG. 4.

FIG. 5 is an expanded version of FIG. 4, in which each of the semantic ID 412, features 414, and needs 416 are expanded to provide a more detailed view of each. Specifically, as shown, the semantic ID 412 is associated with a semantic ID structure 502, in which a unique identifier 504 provides identification for a semantic usage of the semantic ID 412. Meanwhile, a description 506 provides a human readable description of the usage semantics, which may be included in corresponding, generated documentation. Further, a purpose 508 is included in the semantic ID structure and includes a machine-readable declaration of the semantic usage.

As shown, the purpose 508 may include a standard purpose 510, referring to a set of predefined purposes for all compatible business applications. As further shown, with respect to the standard purposes 510, such purposes may include integration 512, associated process step 514, associated analytics 516, and/or associated monitoring 518. The purpose 508 also may include an extended purpose 520, which may refer, for example, to extensions added by a customer or other consumer or purchaser of a relevant application. Thus, the extended purpose 520 identifies application-specific purpose or semantic usages associated with such customizations.

With regard to the features 414, a plurality of associated requirements 521 may be enumerated, where each requirement 522 may include, for example, usage semantics 524, one or more process lists 526, data list 528, and service list 530. As may be appreciated from the above description of FIG. 1, such lists and related information may correspond with the semantic mapper 122, the process mapper 124, and the data mapper 126 of the transformation engine 120 of FIG. 1.

As shown, the usage 524 may relate generally to define usage semantics for the application 402 and its associated requirements 521. The process list 526 may refer generally to a set of processes for the requirement 522. The data list 528 provides a relevant set of data for the defined requirement 522. Finally, similarly, the service list 530 defines the subset of services for the defined requirement.

As also described above, the needs 416 correspond generally to the type of bill of needs described above, e.g., the bill of needs 204 of FIG. 2A. Consequently, in contrast to the features 414 and the requirements 521 which specify set of requirements filled by the application 402 and exposed for external use, the needs 416 and associated requirements 531 provide a set of requirements that the application 402 needs or desires to be filled by some other application or service, e.g., the application 108.

As may be observed, the corresponding requirement structure 532 may correspond substantially or completely identical to the requirement structure 522 associated with the requirement 521 of the features 414. In this way, for example, it may be a straightforward extension for a provider or user of the metamodel of FIG. 4 to add the needs 416 to the metamodel, due to familiarity with the features 414 and associated data requirements 521/522. Moreover, due to such identity between the requirements 521/522 and the needs 416, including requirements 531 and requirement structure 532, it may be straightforward to determine integration points at which the application 402 provides integration points for integration with a second application, which itself, as described with respect to FIG. 2A may utilize requirements 206 which are identical in form and structure to the requirement structures 522, 532.

Figure 6:
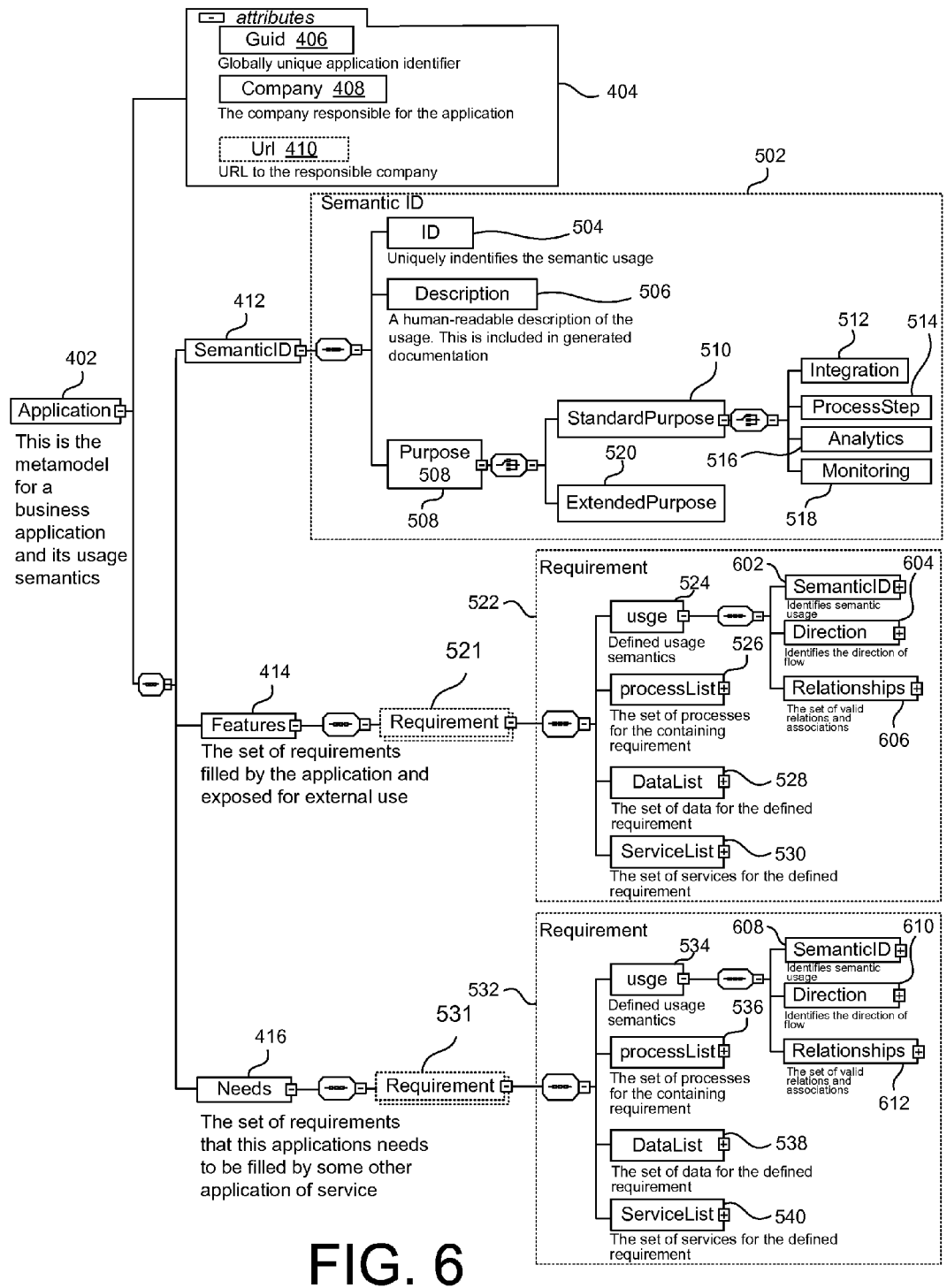
FIG. 6 is a more detailed example of the metamodel of FIG. 5.

FIG. 6 is a further expanded view of the metamodel of FIG. 5, in which additional detail regarding the usage semantics 524/534 are provided. As illustrated, a given instance of such usage semantics may be associated with its own semantic ID 602 that identifies a semantic usage thereof, as well as a direction 604 that identifies a direction of data flow, and relationships 606 that represent a set of valid relationships and associations between various semantic entities. Further, as may be expected from the similarity between the requirement 522 and the requirement 532, the usage semantic 534 of the requirement 532 also may be associated with a semantic ID 608, direction 610, and relationship 612, which may be similar or the same in structure and form with respect to the semantic ID 602, the direction 604, and the relationship 606. Moreover, the semantic ID 602/608, although not specifically illustrated in FIG. 6, may have a structure and format that is identical or substantially identical to the semantic ID 502, which consequently is not reproduced here in detail.

FIGS. 7, 8, 9, 10 provide further detail with respect to the usage semantic 524, the process list 526, the data list 528, and the service list 530, respectively, of the requirement 522. Of course, in this regard, it may be appreciated that the example of FIGS. 7-10 will also be applicable to the identical structures 534, 536, 538, 540 of the requirement 532.

Figure 7:
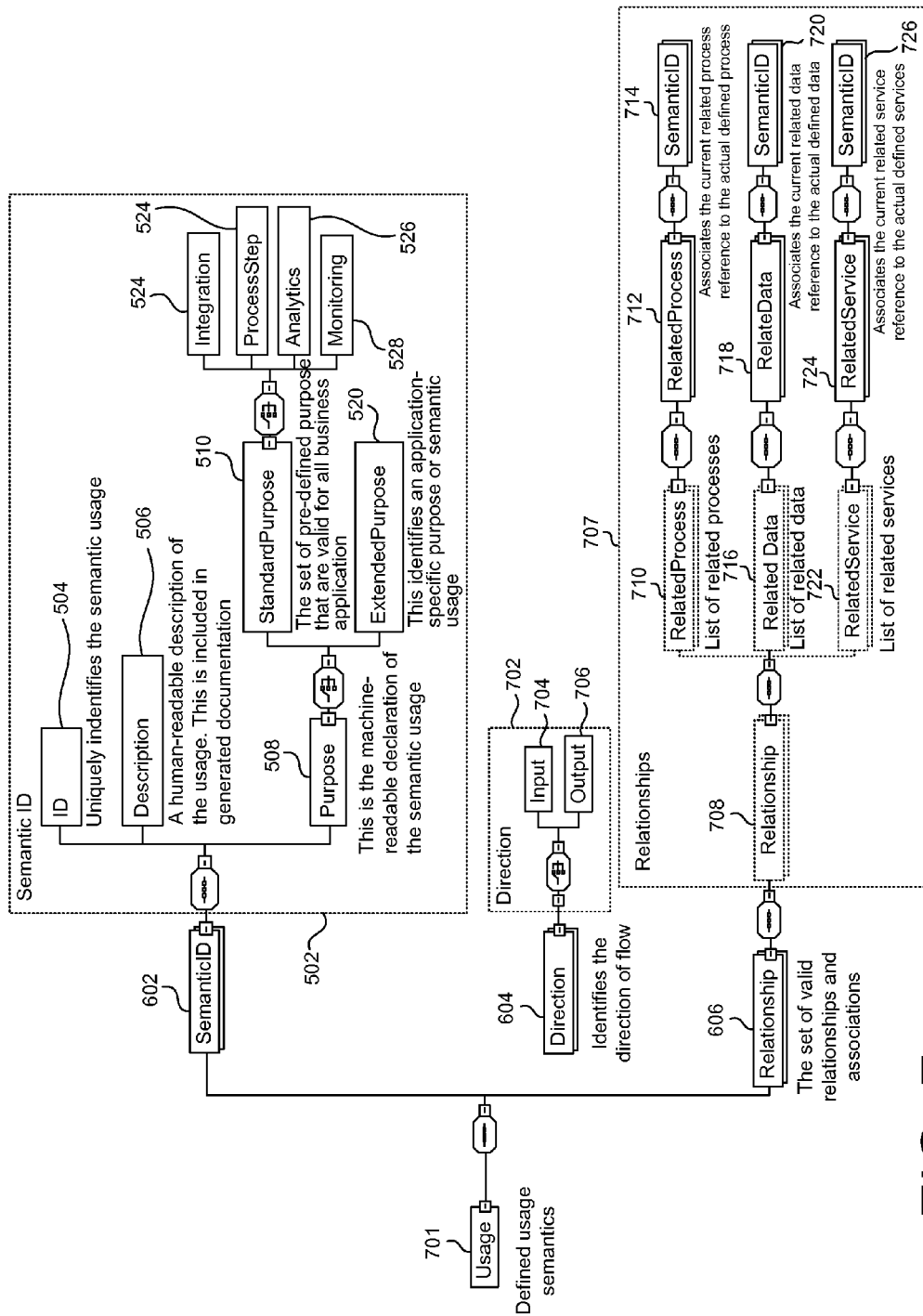
FIG. 7 is a more detailed example of usage semantics included in the metamodels of FIGS. 5 and 6.

Thus, in the example of FIG. 7, further detail regarding usage semantics 701 are provided. As already described, the usage semantics may include the semantic ID 602, which is shown in expanded form as being identical to the semantic ID 502 of FIG. 5, as referenced above. Meanwhile, the direction 604 is expanded to illustrate an example direction 702, and which input 704 and output 706 directions are identified for corresponding data flows.

Further in FIG. 7, a relationship structure 707 illustrates an example form and format for relationship 708 of the set of valid relationships and associations 606 described above. That is, as shown, the relationship 708 may identify related processes 710 in a corresponding list, which identify the referenced related processes 712 themselves, along with semantic ID 714 that associates a current related process reference to the actual defined process. Again, the semantic ID 714 may correspond in form and format to the semantic ID 502.

Similarly, a list of related data 716 may reference corresponding related data 718, which is associated by virtue of the semantic ID 720. Finally in FIG. 7, and similarly, a list of related services 722 may be associated with a corresponding related service 724 by semantic ID 726.

Figure 8:
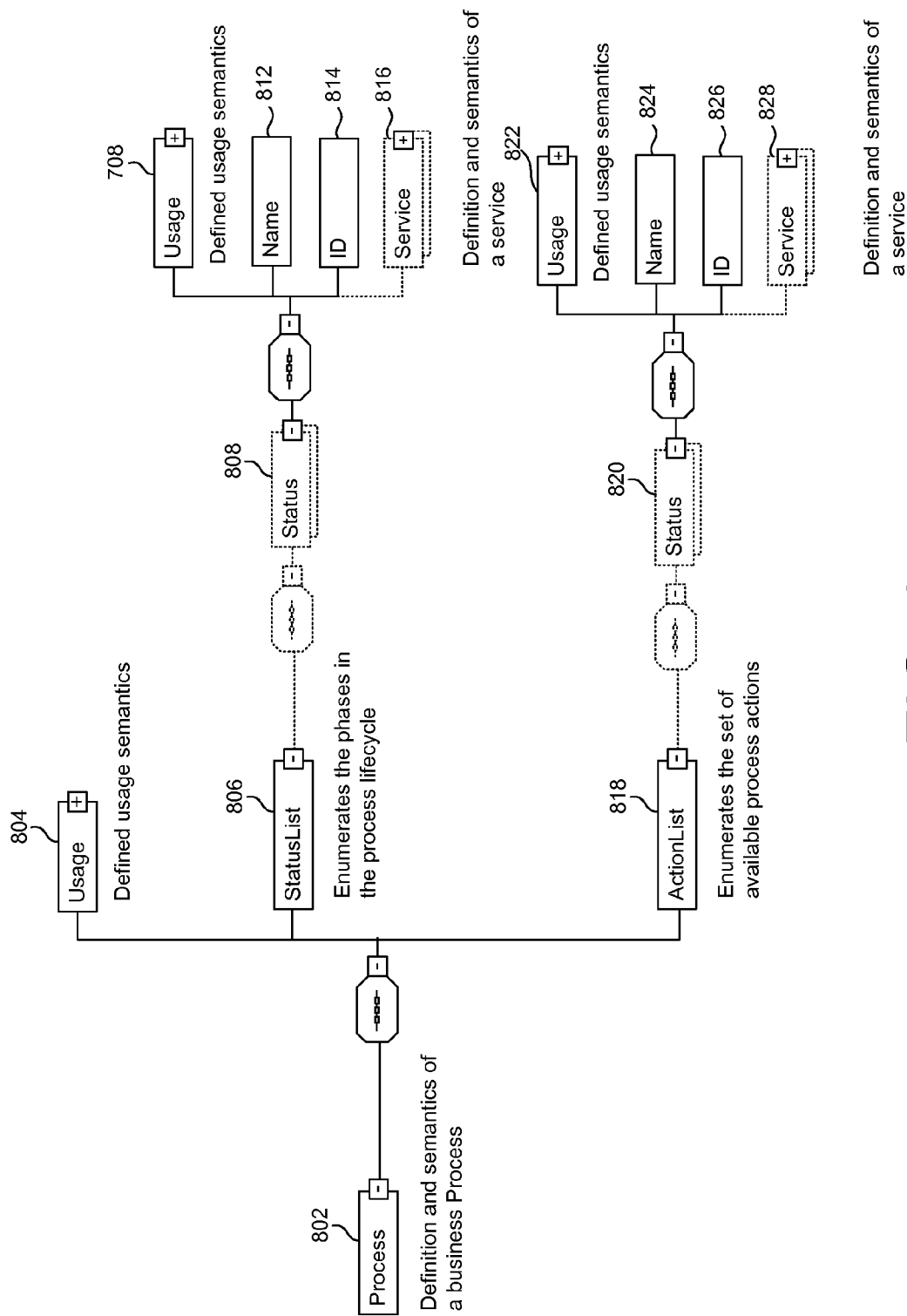
FIG. 8 is a more detailed example of a process list used in the metamodels of FIGS. 5 and 6.

With reference back to, e.g., the requirement 522 of FIGS. 5, 6, the process list 526 may be associated with a process 802 of FIG. 8, which, as illustrated, provides a definition and associated semantics of a particular business process. Specifically, as shown, usage semantics 804 may be provided, along with a status list that enumerates various phases in the process life cycle of the process 802.

Then, corresponding status information 808 may be provided, utilizing associated usage semantics 810, in conjunction with a process name 812 and ID 814, as well as a service definition 816 providing a definition and semantics of related services. It may be noted that the usage semantics 804 and 810 (as well as 822, described below) may correspond to the usage data structures described above with respect to FIG. 7, in the appropriate context illustrated in FIG. 8. Similarly, the service definition and semantics 816 may correspond to related data structures described below with respect to FIG. 10 (similar comments apply to the service 828, described below).

Further in FIG. 8, an action list 818 associated with the process 802 enumerate the set of available process actions, shown in FIG. 8 of actions 820. As referenced, each action 820 may be associated with corresponding defined usage semantics 822, name 824, ID 826 and associated definition/semantic of related services.

Figure 9:
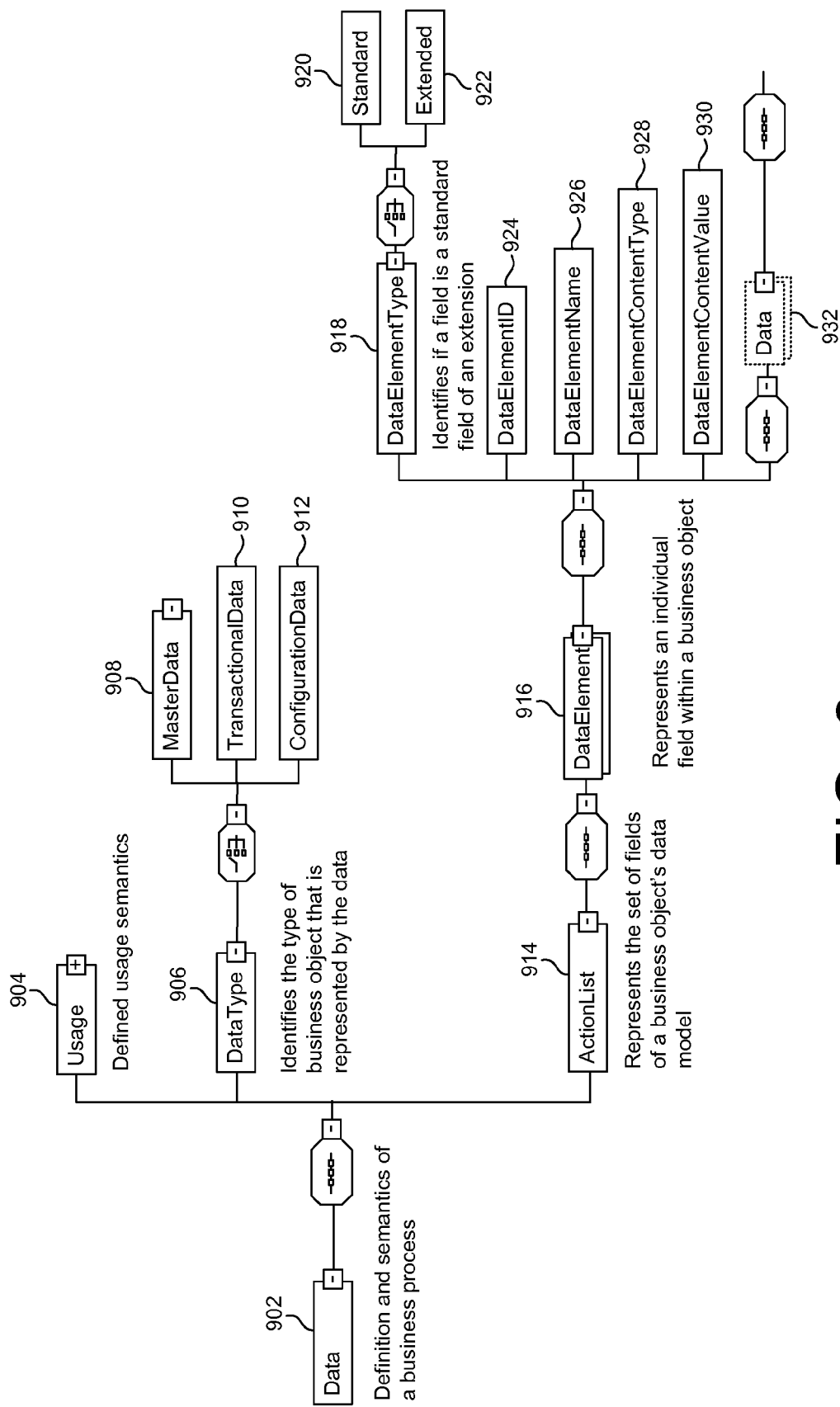
FIG. 9 is a more detailed example of a data list used in the metamodels of FIGS. 5 and 6.

FIG. 9 provides further detail with regard to the data list 528/538 of FIGS. 5/6. Specifically, as shown, data 902 used or produced may be associated with corresponding defined usage semantics 904. A data type 906 may be used to identify the type of business object represented by particular data. For example, as shown, the data type 906 may include master data 908, transactional data 910, and/or configuration data 912.

Further, data elements 914 may be used to represent a set of fields of a business object's data model. Corresponding data elements 916 may thus represent an individual field within a business object. Then, the data element 916, as shown, may be associated with a data element type 918 that identifies whether a field is a standard field 920 or an extension 922. The data element 916 may also be associated with a data element ID 924, a data element name 926, a data element content type 928, and a data element content value 930. Finally with respect to FIG. 9, the data element may be further associated with a data collection 932 of child business objects.

Figure 10:
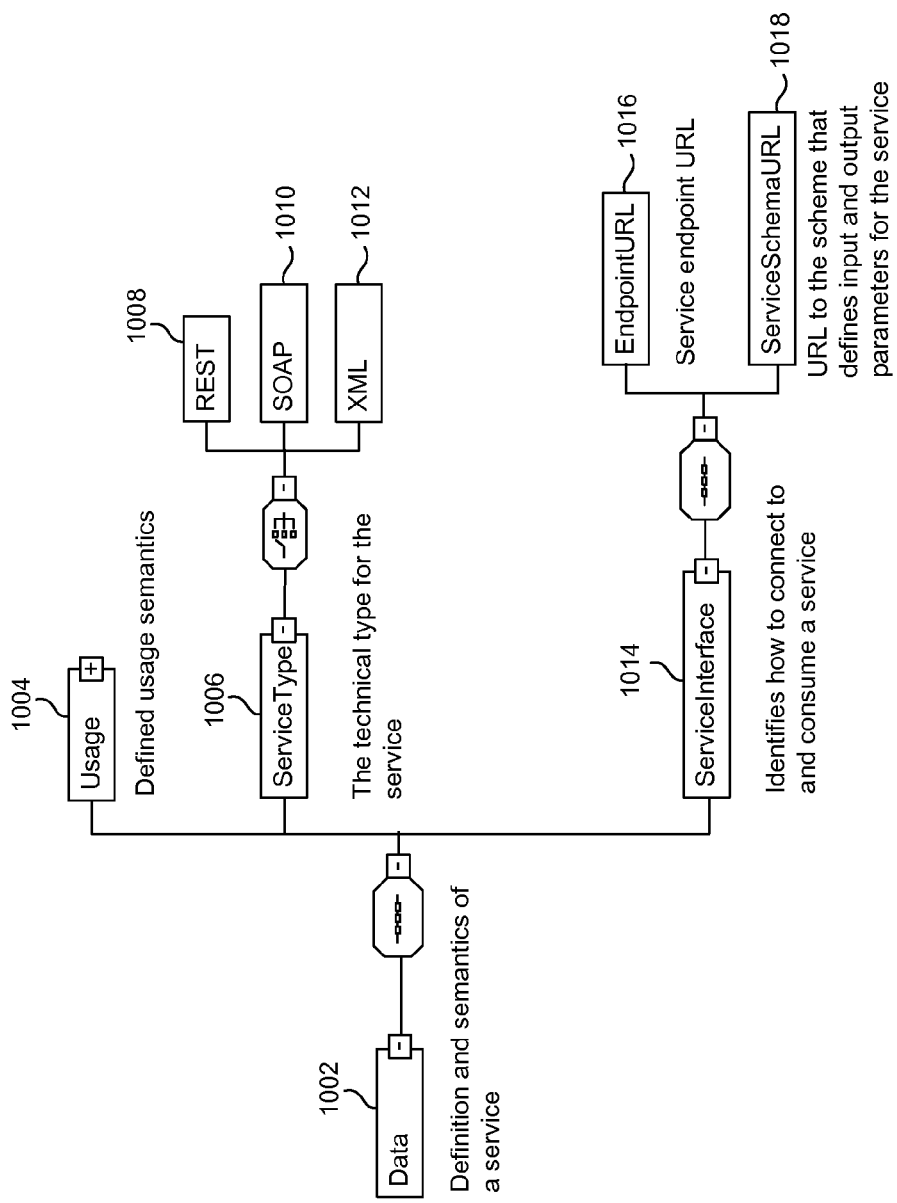
FIG. 10 is a more detailed example of a service list used in the example metamodels of FIGS. 5 and 6.

FIG. 10, as referenced above, provides further detail with respect to the service list 530/540 of FIGS. 5/6. As shown, a service 1002 may be associated with corresponding definition and semantics. Specifically, as shown, usage semantics 1004 may be included. Further, a technical service type 1006 for the service 1002 may be specified, such as, e.g., REST 1008, SOAP 1110 and/or XML 1012.

Further with respect to FIG. 10, a service interface 1014 may be included which identifies a manner in which a related service 1002 may be connected and consumed. Consequently, the service interface 1014 may specify an end point URI (uniform resource identifier) 1016 associated with the service. Further, a service schema URI 1018 may be provided as a URI pointing a schema that defines input and output parameters for the service 1002 in question.

Figure 11:
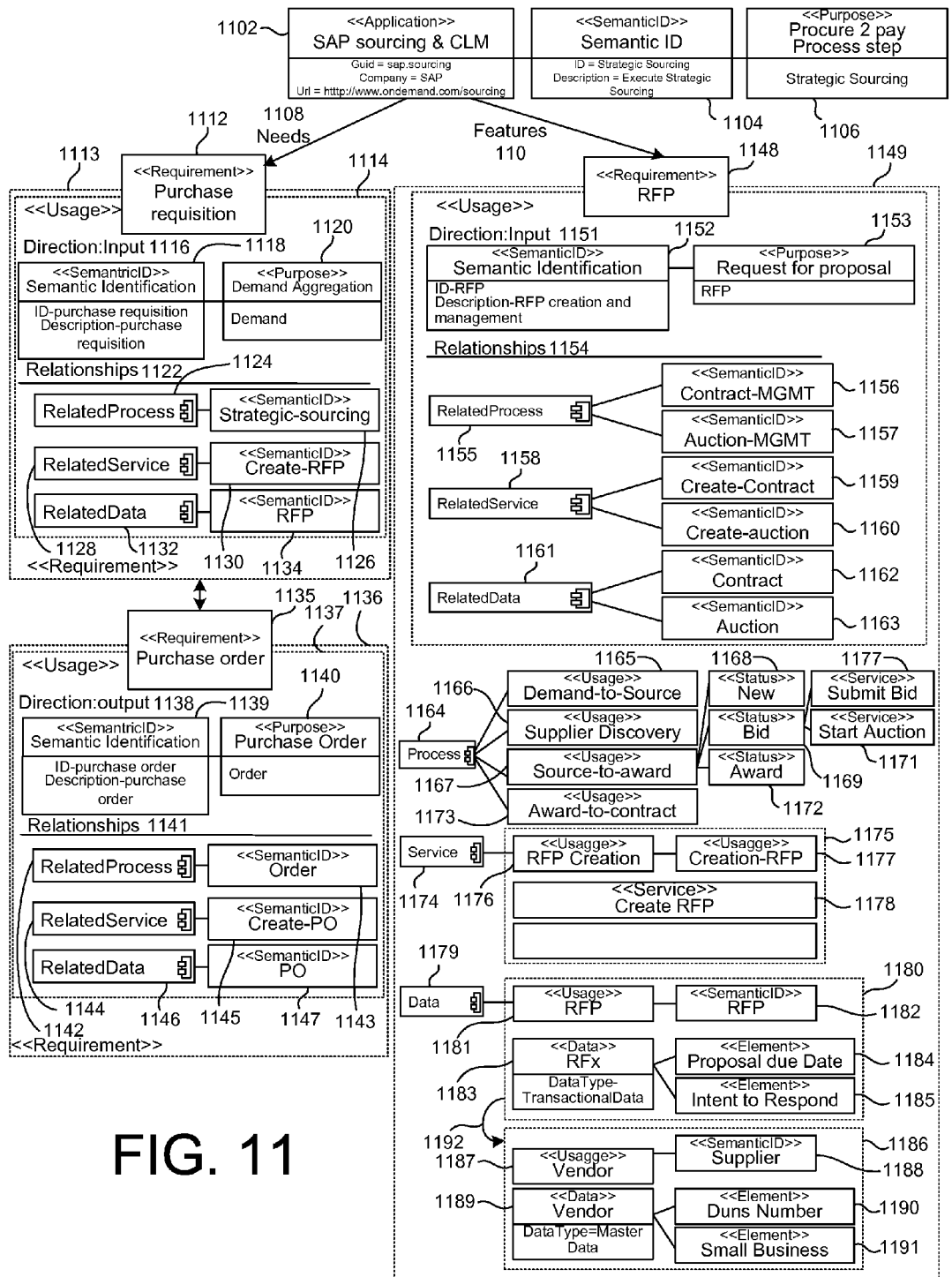
FIG. 11 is a diagram of an example of an application-specific metamodel instance created using the metamodels of FIGS. 4-10 in the system of FIG. 1.

FIG. 11 is a diagram of an application-specific metamodel instance created in conjunction with the application metamodel described above with respect to FIGS. 4-10. Specifically, as shown, an application 1102 may provide strategic sourcing technologies and techniques. As shown, the application 1102 may be associated with corresponding attributes corresponding to the attributes 404 of FIG. 4. Specifically, as shown, such attributes may include a GUID, a company identifier, and a corresponding URL. Further, a semantic ID 1104 corresponding to the semantic ID 412 of FIG. 4 may be included which itself may include a purpose 1106 corresponding, for example, to the purpose 508 of FIG. 5, which provides a machine-readable declaration of the semantic usage of the application in question.

Further, the example of FIG. 11 provides specific instances of needs 1108, corresponding to the needs 416 of FIG. 4, as well as features 1010 corresponding to the features 414 of FIG. 4. Then, in the specific example, the needs 1108 may include a first requirement 1112 related to a purchase requisition. As shown, the requirement structure 1113 includes usage semantics 1114, again corresponding to the related structures of FIGS. 5, 6. Specifically, as shown, a direction 1116 specifies an input direction, and a semantic ID 1118 provides an ID for a purchase requisition and associated description. Again, the semantic ID 1118 is linked to a purpose 1120, e.g., a purpose of aggregating demand.

Then, relationships 1122 may specify related processes 1124, such as may be associated with a semantic ID 1126 for strategic sourcing. Similarly, a related service 1128 may be associated with a semantic ID for creating a request for proposal (RFP). Further, related data 1132 may be associated with a semantic ID for 1134 for the RFP itself.

Similar, and supply to a second need/requirement 1135 for a purchase order, specifically, as shown, the requirement 1136 includes usage semantics 1137, including a direction 1138 specifying an output direction. A semantic ID 1139 again specifies an ID (i.e., purchase order) and associated description, and is associated with a purpose 1140 of providing a purchase order.

Relationships 1141 specify a related process 1142 having a semantic ID 1143 for an order to be issued. A related service 1144 is associated with a semantic ID 1145 describing creation of a purchase order (PO). Further, related data 1146 is associated with a semantic ID for the PO 1147 itself.

Similar comments apply to the example RFP requirement 1148, and associated data structure 1149. Specifically, as shown, a usage semantics 1150 specifies a direction 1151 as an input direction. A semantic ID 1152 provides a corresponding RFP identifier and description, along with a purpose 1153 specifying the purpose of request for a proposal.

Relationships 1154 include a related process 1155 having a semantic 1156 for contract management, and a semantic ID 1157 for auction management. A related service 1158 is associated with a semantic ID 1159 for creation of a contract, as well as a semantic ID 1160 for creation of an auction. Related data 1161 is associated with a semantic ID 1162 for the resulting contract itself while, similarly, a semantic 1163 provides the created/managed auction.

Further, a process 1164 corresponding to the description of FIG. 8 includes usage semantics 1165 describing a demand-to-source, a usage net 1166 related to supplier discovery, usage semantics 1167 relating source-to-award, and usage semantics 1173 relating award-to-contract. As further shown, the usage semantics 1167 may include a status 1168 (new), a status 1169 (bid), and status 1172 (award). As also shown, the status 1169 may include a specified service 1170 for submitting a bid, as well as a service 1171 for starting a related auction.

A service 1174 corresponding conceptually to the service of FIG. 10, includes a structure 1175 that specifies usage semantics 1176 related to RFP creation, which has a semantic ID 1177 associated therewith. Then, a service 1178 is specified as having a service type SOAP, along with a relevant URI and service schema URI. Then, data 1179, corresponding to FIG. 9, provides data structure 1180 which specifies usage semantics 1181 related to an RFP, along with a corresponding semantic ID 1182. A data type 1183 specifies an RFx with element 1184 related to a proposal due date, and element 1185 related to an intent to respond. Then, structure 1186 includes usage semantics 1187 for a vendor, having a semantic ID 1188 shown as "supplier." A data type 1189 for the vendor will be shown as master data, where, in the example, one element is a DUNS number 1190, and a second element 1191 identifies the vendor as a small business. Finally with respect to FIG. 9, a relationship 1192 is also illustrated between the data structures 1180, 1186.

Thus, with respect to the above description of FIGS. 1-10, the application-specific metamodel instance of FIG. 11 may be understood to illustrate such an instance for an underlying sourcing application. In the example, the various features 1110 illustrate that the application in question has the capabilities to provide an RFP. Further, the needs 1108 specify that, in order to provide the RFP, the application may desire or require a second application to generate a purchase requisition 1112 and/or a purchase order 1135.

As described in detail, the application in the example of FIG. 11 may thus represent, for example, the requisition application 104 of FIG. 2A, in which the needs 1108 correspond to the bill of needs 204 described with respect thereto, and the features 1110 correspond to the application features 202. Then, some second application and corresponding application-specific metamodel instance, not specifically illustrated with respect to FIG. 11, and corresponding to the sourcing application 108 of FIG. 2A, may be discovered within the repository 115. Thereupon, the application of FIG. 11 may easily be integrated with one or more such applications in order to fulfill the needs 1108 in an automatic, cost effective, and efficient manner.

For the sake of further illustration example, a developed XML schema for representing one of the semantic metamodels 102 of FIG. 1 is provided below. Of course, it may be appreciated that the provided XML schema is intended merely for the sake of further illustration example with respect to a particular implementation of such a semantic metamodel, in conjunction with the examples provided above with respect to FIGS. 4-11. Thus, in this regard, the provided XML schema should not be understood to be limiting of the types of current and future techniques that may be utilized to represent the semantic metamodels 102.

Code Portion 1

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer readable storage medium and executable by at least one processor, the system comprising:
    a metamodel selector configured to cause the at least one processor to determine a semantic metamodel applicable to at least two software applications, the semantic metamodel including a description of semantics, processes, and data that are applicable to the at least two software applications;
    a metadata manager configured to cause the at least one processor to obtain first application metadata describing functionality provided by a first software application of the at least two software applications;
    a transformation engine configured to cause the at least one processor to transform the first application metadata into a first application-specific metamodel instance of the semantic metamodel, the transformation including translating the first application metadata into requirements that specify application functionality for the first software application, and mapping a portion of the requirements in the first software application to requirements in a second software application of the at least two software applications, the portion selected based on discovering that the first software application is requesting functionality associated with the second software application; and
    an integration engine configured to cause the at least one processor to integrate the at least two software applications, including the portion, based on the first application-specific metamodel instance and the requested functionality, and based on a second application-specific metamodel instance of the semantic metamodel obtained from second application metadata of the second software application,
    wherein the transformation engine is configured to cause the at least one processor to transform the first application metadata into the first application-specific metamodel instance of the semantic metamodel independently of the second application-specific metamodel instance.

2. The system of claim 1, wherein the metamodel selector is further configured to search a metamodel repository storing a plurality of semantic metamodels to select the semantic metamodel therefrom.

3. The system of claim 2, wherein the metamodel selector includes a feature selector configured to select portions of the first application metadata for use in selecting the semantic metamodel from the plurality of semantic metamodels.

4. The system of claim 1, wherein the metadata manager is configured to provide the first application metadata based on an analysis of the first software application.

5. The system of claim 1, wherein the transformation engine includes:
    a semantic mapper configured to perform a mapping of semantics of the first software application metadata using the semantics description of the semantic metamodel and for inclusion within the first application-specific metamodel;
    a process mapper configured to perform a mapping of processes described in the first application metadata using the processes description of the semantic metamodel and for inclusion within the first application-specific metamodel; and
    a data mapper configured to perform a mapping of data described in the first application metadata using the data description of the semantic metamodel and for inclusion within the first application-specific metamodel.

6. The system of claim 1, wherein the semantic metamodel defines features applicable to the at least two software applications, and the first application-specific metamodel instance includes instantiations of a subset of the defined features that are provided by the first software application.

7. The system of claim 1, wherein the semantic metamodel defines needs applicable to the at least two software applications, and the first application-specific metamodel instance includes instantiations of a subset of the defined needs that are requested by the application for fulfillment thereof by the second software application.

8. The system of claim 7, wherein a repository is configured to store a plurality of application-specific metamodel instances corresponding to a plurality of applications, including the at least two applications, and further comprising an application matcher configured to match needs of the first software application with features of at least one of the stored application-specific metamodel instances, for fulfillment therewith.

9. The system of claim 8, wherein the application matcher is further configured to perform a search of the stored application-specific metamodel instances in the repository that are instantiated from the semantic metamodel, based on the needs of the first software application.

10. A computer-implemented method for causing at least one processor to execute instructions recorded on a computer-readable storage medium, the method comprising:
    determining a semantic metamodel applicable to at least two software applications, the semantic metamodel including a description of semantics, processes, and data that are applicable to the at least two software applications;
    obtaining application metadata describing functionality provided by a first software application of the at least two software applications;
    transforming the first application metadata into a first application-specific metamodel instance of the semantic metamodel, the transformation including translating the first application metadata into requirements that specify application functionality for the first software application, and mapping a portion of the requirements in the first software application to requirements in a second software application of the at least two software applications, the portion selected based on discovering that the first software application is requesting functionality associated with the second software application; and integrating the at least two software applications, including the portion, based on the first application-specific metamodel instance and the requested functionality, and based on a second application-specific metamodel instance of the semantic metamodel obtained from second application metadata of the second software application, wherein the transformation engine is configured to cause the at least one processor to transform the first application metadata into the first application-specific metamodel instance of the semantic metamodel independently of the second application-specific metamodel instance.

11. The method of claim 10, wherein the transforming further includes:

performing a mapping of semantics of the first software application metadata using the semantics description of the semantic metamodel and for inclusion within the first application-specific metamodel;

performing a mapping of processes described in the first application metadata using the processes description of the semantic metamodel and for inclusion within the first application-specific metamodel; and performing a mapping of data described in the first application metadata using the data description of the semantic metamodel and for inclusion within the first application-specific metamodel.

12. The method of claim 10, wherein the semantic metamodel defines features applicable to the at least two software applications, and the first application-specific metamodel instance includes instantiations of a subset of the defined features that are provided by the first software application.

13. The method of claim 10, wherein the semantic metamodel defines needs applicable to the at least two software applications, and the first application-specific metamodel instance includes instantiations of a subset of the defined needs that are requested by the application for fulfillment thereof by the second software application.

14. A computer program product, the computer program product being tangibly embodied on a non-transitory computer-readable medium and comprising instructions that, when executed, are configured to cause at least one processor to:

determining a semantic metamodel applicable to at least two software applications, the semantic metamodel including a description of semantics, processes, and data that are applicable to the at least two software applications;

obtaining application metadata describing functionality provided by a first software application of the at least two software applications;

transforming the first application metadata into a first application-specific metamodel instance of the semantic metamodel, the transformation including translating the first application metadata into requirements that specify application functionality for the first software application, and mapping a portion of the requirements in the first software application to requirements in a second software application of the at least two software applications, the portion selected based on discovering that the first software application is requesting functionality associated with the second software application; and integrating the at least two software applications, including the portion, based on the first application-specific metamodel instance and the requested functionality, and based on a second application-specific metamodel instance of the semantic metamodel obtained from second application metadata of the second software application, wherein the transformation engine is configured to cause the at least one processor to transform the first application metadata into the first application-specific metamodel instance of the semantic metamodel independently of the second application-specific metamodel instance.

15. The computer program product of claim 14, wherein the instructions, when executed, are further configured to:

perform a mapping of semantics of the first application metadata using the semantics description of the semantic metamodel and for inclusion within the first application-specific metamodel;

perform a mapping of processes described in the first application metadata using the processes description of the semantic metamodel and for inclusion within the first application-specific metamodel; and perform a mapping of data described in the first application metadata using the data description of the semantic metamodel and for inclusion within the first application-specific metamodel.

16. The computer program product of claim 14, wherein the semantic metamodel defines features applicable to the at least two software applications, and the first application-specific metamodel instance includes instantiations of a subset of the defined features that are provided by the first software application.

17. The computer program product of claim 14, wherein a repository is configured to store a plurality of application-specific metamodel instances corresponding to a plurality of applications, including the at least two applications, and further comprising an application matcher configured to match needs of the first software application with features of at least one of the stored application-specific metamodel instances, for fulfillment therewith.

* * * * *